Aug. 27, 1940.    C. T. PERKINS    2,213,017
AIR CONDITIONER FOR AUTOMOBILES
Filed June 9, 1938
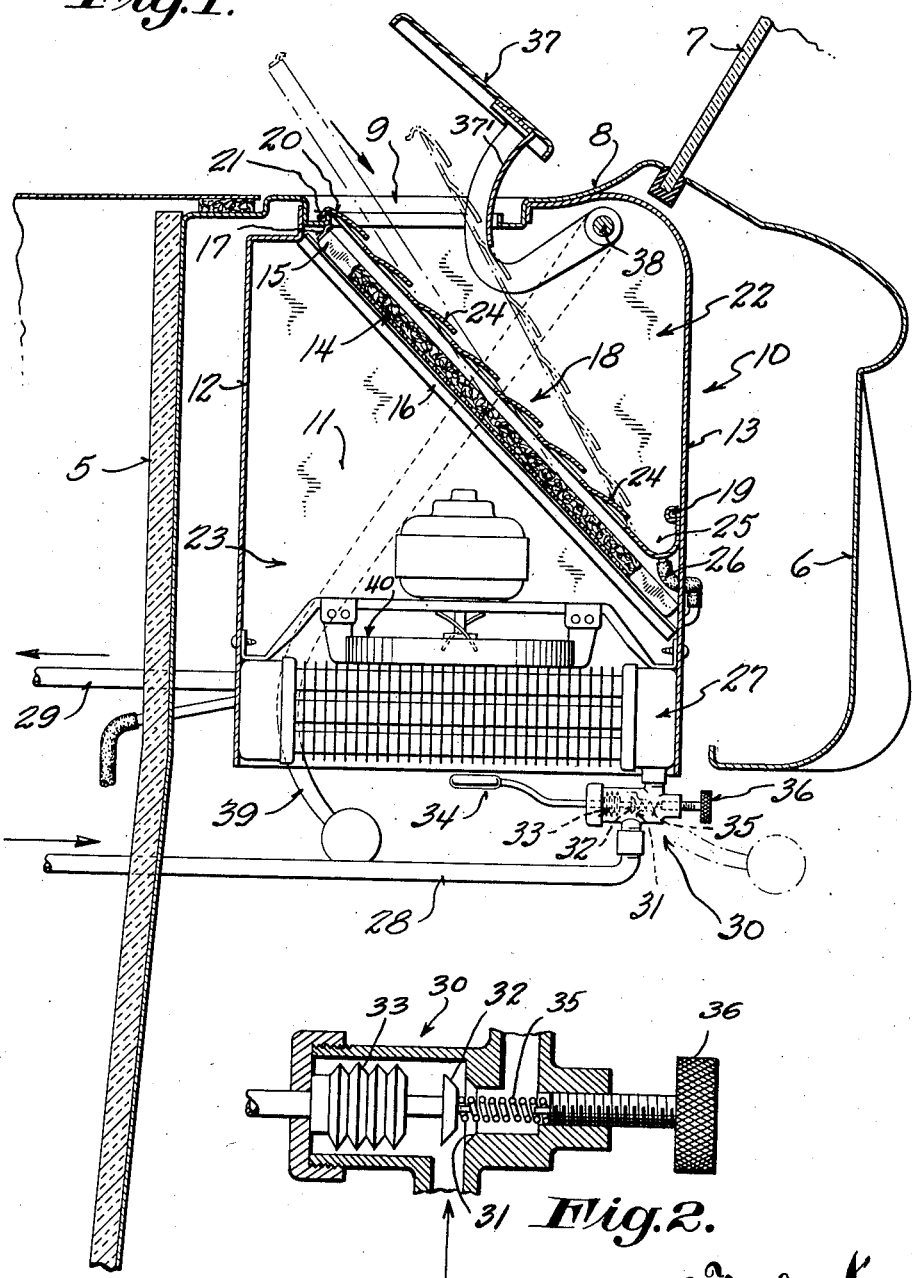
Inventor
Charles T. Perkins Patented Aug. 27, 1940

2,213,017

UNITED STATES PATENT OFFICE

2,213,017

AIR CONDITIONER FOR AUTOMOBILES

Charles T. Perkins, Racine, Wis., assignor to Modine Manufacturing Company, Racine, Wis., a corporation of Wisconsin Application June 9, 1938, Serial No. 212,618

8 Claims. (Cl. 98—2)

This invention relates to air conditioners for automobiles, and refers particularly to air conditioners of the type illustrated in the copending application of Charles T. Perkins, Serial No. 169,397, filed October 16th, 1937, for Air conditioning means for automobiles.

In air conditioners of this type, outside air is taken into the automobile body through an opening in the cowl and this air, after having precipitation removed therefrom, and after being filtered, passes through a heat exchanger to be discharged therefrom into the interior of the body.

The present invention makes no change in this general arrangement, but contemplates an improvement thereover through a more compact and simplified construction.

This invention also contemplates as one of its objects to so arrange the filter as to make removal and replacement thereof easier.

Another object of this invention is to so construct the conditioner that the air filter is removable through the cowl opening.

A further object of this invention is to provide an air conditioner of the character described with an air filter and a baffle arranged substantially in planar alignment with the direction of air entry into the conditioner to insure a uniform distribution of air pressure over the entire area of the baffle and the filter.

Still another object of this invention is to provide means thermostatically regulating the flow of temperature modifying medium to the heat exchanger.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a vertical sectional view through a portion of an automobile body, illustrating the application of this invention thereto; and Figure 2 is an enlarged sectional view of the thermostatically regulated valve which controls the supply of temperature modifying medium to the heat exchanger.

Referring now particularly to the accompanying drawing in which like numerals indicate like parts, the numeral 5 designates the dashboard of an automobile, which separates the engine compartment from the passenger compartment. Spaced rearwardly therefrom is an instrument panel 6 having a windshield 7 extending upwardly therefrom in the conventional manner. A cowl 8 connects the space between the instrument panel and the dashboard, and has a cowl opening 9 therein.

The air conditioner of this invention is disposed in the space between the dashboard and instrument panel and comprises a housing 10 secured to the undersurface of the cowl in position to receive fresh outside air through the cowl opening 9. The housing 10 has vertical side walls 11 and end walls 12 and 13. The width of the housing is substantially the same as the length of the opening 9, but its depth, as defined by the end walls 12 and 13, is greater than the width of the cowl opening.

An air filter 14 is diagonally disposed across the interior of the housing with one end 15 adjacent to the front edge of the cowl opening and its other end adjacent to the wall 13. The filter is removably supported by a pair of rails 16 secured to each wall 11. A spring clip 17 secured to the end 15 of the filter frame and engaging the adjacent lower edge of the cowl opening holds the filter in place and against rattling.

A baffle 18 pivotally mounted adjacent to the end wall 13 as at 19 extends diagonally across the interior of the housing substantially parallel with the filter and has its free end 20 contacting the adjacent edge portion of the cowl opening to be supported thereby. A portion 21 on the end 20 of the baffle engages and snaps over the edge of the cowl opening to hold the baffle in a position dividing the housing into an air inlet compartment 22 and an air discharge compartment 23.

The baffle comprises a plurality of rearwardly and downwardly extending louvers 24 to direct any precipitation which may enter the air inlet compartment downwardly to a trough 25 from which a drain 26 leads to carry off such precipitation.

The louvers 24 extend substantially horizontally across the casing and are transversely downwardly inclined to shed precipitation while permitting the passage of air therebetween.

Inasmuch as the baffle is mounted between the air filter and the air inlet opening, access to the filter is had by swinging the baffles toward the rear edge of the opening. This enables the filter to be withdrawn edgewise through the air inlet opening, it being understood that the filter in spanning the distance between the side walls 11 of the housing is of a size to permit its passage through the opening.

Mounted in the lower portion of the housing 10 is the heat exchanger 27 through which the air passes to be discharged into the interior of the vehicle. The heat exchanger is suitably supplied with a temperature modifying medium by a supply line 28, a return line 29 conveying the temperature modifying medium back to its source. For heating, the temperature modifying medium is conveniently obtained from the cooling system of the automobile (not shown).

A valve 30 in the supply line 28 controls the supply of the temperature modifying medium to the heat exchanger. As illustrated, this valve has a seat 31 adapted to receive a valve disc 32 to close off the supply to the heat exchanger. The valve disc 32 is automatically controlled by a temperature responsive element which comprises a bellows 33 of the Sylphon type, which is mounted inside the valve and connected to the valve stem. An antenna tube 34 communicating with the bellows and containing a supply of expansible fluid extends outwardly from the valve housing into the path of air issuing from the heat exchanger.

The bellows 33 is operable to close the valve upon a rise in temperature, which causes expansion of the liquid in the tube and the bellows.

The temperature responsive element is preferably set to actuate the valve to its closed position when the temperature rises above a comfortable level, and may be adjusted by regulating the force with which a spring 35 acting against closure of the valve opposes the bellows. The tension of the spring is controlled by means of a screw 36 against which one end of the spring bears. This screw is readily accessible to an occupant of the vehicle.

The action of the temperature responsive element is, of course, dependent upon the ability of the heat exchanger to cope with the temperature differential between the outside air and the desired temperature to be maintained inside the automobile, with relation to the velocity and volume of air passing through the housing. Hence, to enable the heat exchanger to properly cope with the air passing through the housing and maintain the desired uniform temperature in the automobile under varying conditions of outside temperature, the velocity and volume of air entering the housing is controllable. To this end a throttle door 37 is pivotally mounted as at 38 to regulate the influx of air through the air inlet opening. Any suitable manually operable means may be provided for opening and closing the door. In the present instance, a lever 39 serves this purpose.

It is to be observed that the throttle door 37 projects upwardly at a forward angle above the cowl to extend into the air stream incidental to the forward motion of the automobile and deflect the air down into the inlet compartment 22 at an angle indicated by the arrow in the drawing. To facilitate this action of the door 37, a deflector 37' is carried by its rear portion.

Regardless of the position of adjustment at which the door 37 may be set, the direction of air-flow into the inlet compartment 22 is substantially the same; and as the inclination of the filter and baffle is substantially parallel to this direction of air influx, a better and more uniform distribution of pressure over the entire area of the filter is obtained. Concentrated flow through a small area of the filter is thus precluded; and as a result, the period of usefulness of the filter is increased.

In operation, the throttle door 37 is moved to restrict the velocity and volume of air entering the housing when the outside air is cold so that the heat exchanger may properly heat the same to the desired degree. If, however, the temperature of the air issuing from the heat exchanger rises beyond the degree to which the temperature responsive element is set, it will operate to close off the supply of heating medium to the heat exchanger; and when the temperature falls below the desired level, the temperature responsive element operates to re-open the valve and connect the heat exchanger with its source of heating fluid.

Thus, it will be seen that by adjusting the position of the throttle door in accordance with the temperature of the outside air, the temperature responsive element will operate to allow the desired amount of heating fluid to flow through the valve to the heat exchanger to maintain a desired uniform temperature for the air entering the interior of the vehicle.

An air impeller 40, suitably positioned above the heat exchanger may be provided for insuring the desired influx of air into the interior of the vehicle when such a result is not obtained in the normal operation of the vehicle; as for instance, when the vehicle is moving forwardly with a tail wind or when the vehicle is standing still.

From the foregoing description taken in connection with the accompanying drawing, it will be readily apparent to those skilled in the art that this invention provides a novel construction in which replacement of the filter unit is greatly facilitated, and that it provides simple means for controlling the supply of temperature modifying fluid to the heat exchanger to maintain the temperature in the passenger compartment uniformly at a desired degree.

What I claim as my invention is:

1. In an air conditioner for automobiles having a body provided with an air inlet opening in one of its outside walls: closure means for the air inlet opening movable to and from closed position; a housing adjacent to said wall inside the body and positioned to receive air entering said opening and conduct the same to the interior of the body; an air filter of a size to pass through the air inlet opening; means for removably mounting the air filter inside the casing in a position such that air flowing through the casing must pass therethrough to gain access to the interior of the body; a baffle in the housing above the filter for trapping precipitation which may enter the air inlet opening, said baffle comprising a plurality of spaced transversely downwardly inclined louvers extending substantially horizontally across the housing; means for movably mounting said baffle at a downward inclination with the uppermost of its transverse louvers adjacent to one edge of the air inlet opening and with its lower edge adjacent to the wall of the housing opposite said edge of the inlet opening so that the baffle is interposed between the inlet opening and the filter, and whereby movement of the baffle away from said edge of the opening affords access to the filter through the air inlet opening and enables removal of the filter therethrough; and means for receiving and draining off precipitation shed by the baffle.

2. In an air conditioner for automobiles having a body provided with an air inlet opening in one of its outside walls: a housing adjacent to said wall and positioned to receive air entering said opening and conduct the same to the interior of the body; closure means for the air inlet opening movable to and from a closed position; means inside the housing and spaced inwardly of the inlet opening for collecting precipitation; means for discharging precipitation from said collecting means; a baffle for deflecting precipitation entering the opening and conducting it to said collecting means, said baffle extending across the interior of the housing to divide the same into an air inlet compartment and a discharge compartment and having air passage therethrough; temperature modifying means in the discharge compartment; an air filter in the discharge compartment between the temperature modifying means and the baffle, said filter having an area considerably larger than that of the air inlet opening but being of such dimensions as to pass through said opening; means removably mounting the air filter in the discharge compartment with one edge adjacent to the air inlet opening; and means movably mounting the baffle for movement to a position affording access to the air filter from the air inlet opening so that the air filter may be removed from the housing through the air inlet opening.

3. In an air conditioner for automobiles having a body provided with an air inlet opening in one of its outside walls; means at said inlet opening for directing outside air into the opening in a direction angular with respect to the direction of travel as the automobile moves forwardly and for closing said opening when desired; a housing having an inlet and an outlet and mounted inside the automobile body with its inlet positioned to receive air entering the inlet opening; an air filter in said housing to cleanse air moving therethrough; and a baffle in the housing between the filter and its inlet, said baffle having air passages distributed over its area and being mounted substantially parallel with the angular path of the air entering the housing so that the pressure of air on the baffle is substantially uniformly distributed over its entire area to insure uniform pressure over the entire area of the filter.

4. In an air conditioner for automobiles having a body provided with an air inlet opening in one of its outside walls: means at said inlet opening for directing the flow of outside air incidental to forward motion of the automobile into the opening at an angle to the direction of forward motion of the automobile and for closing said opening when desired; a housing having an inlet and an outlet and mounted inside the automobile body with its inlet positioned to receive air entering the inlet opening; an air filter in said housing to cleanse air moving therethrough; a baffle in the housing between the filter and its inlet, said baffle being mounted substantially parallel with the angular path of the air entering the housing so that the pressure of air on the baffle is substantially uniformly distributed over its entire area to insure uniform pressure over the entire area of the filter, said baffle comprising a series of transversely downwardly and rearwardly inclined spaced louvers to deflect rain and moisture downwardly and rearwardly while permitting passage of air through the spaces therebetween; and means to collect and drain off such moisture.

5. In a ventilating system for automobiles having a windshield and a cowl provided with an opening in its top wall in front of the windshield: closure means for the air inlet opening movable to and from a closed position; a casing having an inlet opening directly communicating with said opening in the cowl and a discharge opening communicating with the interior of the body of the automobile; a filter unit arranged at an inclined angle across said casing and comprising a filter plate and a cover overlying said plate and formed by a plurality of transversely downwardly inclined louvers, the longitudinal axes of which extend substantially horizontally across the casing so as to shed water while permitting the passage of air to the filter plate through the spaces between the louvers; and a drainage trough adjacent to the lower edge of said cover having a discharge outlet communicating with the exterior of the casing and the exterior of said body.

6. In combination: an automobile having a windshield and a cowl provided with an opening in its top wall in front of the windshield; an air duct under the cowl having its inlet end connected with the undersurface of the cowl around the opening therein so that air entering the opening must flow down into the duct, the outlet end of the duct being arranged to discharge into the interior of the automobile; closure means movable to a closed position preventing air flow through the opening and duct to the interior of the automobile; a baffle plate composed of a plurality of adjacent louvers; means mounting the baffle plate in the duct in an inclined position beneath the cowl opening and with its louvers extending substantially horizontally across the duct and transversely downwardly inclined to shed precipitation which enters the cowl opening while permitting passage of air through the spaces therebetween; means adjacent to the lower edge of the baffle plate providing a drainage trough; means for carrying off water which accumulates in the drainage trough; and an air filter so positioned in the duct and beneath the baffle plate that all air passing through the baffle plate must flow through the filter.

7. In combination: an automobile having a windshield and a cowl provided with an opening in its top wall in front of the windshield; an air duct under the cowl having its inlet end connected with the undersurface of the cowl around the opening therein so that air entering the opening must flow down into the duct, the outlet end of the duct being arranged to discharge into the interior of the automobile; closure means movable to a closed position preventing air flow through the opening and duct to the interior of the automobile; a baffle plate composed of a plurality of adjacent louvers; means mounting the baffle plate in the duct in an inclined position beneath the cowl opening and with its louvers extending substantially horizontally across the duct and transversely downwardly inclined to shed precipitation which enters the cowl opening while permitting passage of air through the spaces therebetween; means adjacent to the lower edge of the baffle plate providing a drainage trough; means for carrying off water which accumulates in the drainage trough; a flat plate-like air filter having an area substantially larger than the air inlet formed by the cowl opening; and means mounting said filter in the duct under the baffle plate and substantially parallel thereto so that the air flowing through the baffle plate is diffused thereby over the entire area of the filter.

8. In combination: an automobile having a windshield and a cowl provided with an opening in its top wall in front of the windshield; an air duct under the cowl with its inlet end connected to the undersurface of the cowl around the cowl opening so that all air entering the opening flows down into the duct, said duct having its outlet end arranged to discharge into the interior of the automobile; closure means movable to a closed position preventing air flow through the opening and duct to the interior of the automobile; a baffle disposed in the duct at a downward inclination beneath the cowl opening and having a passage therethrough and arranged to shed precipitation which enters the cowl opening while permitting the passage of air therethrough; means forming a drainage trough in which such precipitation gathers; a discharge leading from said drainage trough; a plate-like filter having an area substantially greater than that of the air inlet formed by the cowl opening but of such dimensions as to pass therethrough; means removably mounting the filter in the casing under the baffle; and means movably mounting the baffle to permit movement thereof to a position affording access to the filter through said cowl opening.

CHARLES T. PERKINS.